United States Patent [19]

Murphy

[11] Patent Number: 5,402,880
[45] Date of Patent: Apr. 4, 1995

[54] ARTICLE CARRYING CHAIN HAVING FREE TAB

[75] Inventor: James F. Murphy, Lynchburg, Va.

[73] Assignee: Rexnord Corporation, Milwaukee, Wis.

[21] Appl. No.: 921,417

[22] Filed: Jul. 27, 1992

Related U.S. Application Data

[63] Continuation of Ser. No. 234,322, Aug. 18, 1988, abandoned.

[51] Int. Cl.⁶ ............................................. B65G 17/06
[52] U.S. Cl. ................................................... 198/852
[58] Field of Search ......................... 198/831, 852, 853

[56] References Cited

U.S. PATENT DOCUMENTS

| | | | |
|---|---|---|---|
| 3,269,526 | 8/1966 | Imse et al. | 198/189 |
| 3,669,247 | 6/1972 | Pulver | 198/852 |
| 3,768,631 | 10/1973 | Wahren | 198/189 |
| 3,779,368 | 12/1973 | Smith | 198/204 |
| 3,804,232 | 4/1974 | Freiwald et al. | 198/195 |
| 4,153,152 | 5/1979 | Lapeyre | 198/852 |
| 4,436,200 | 3/1984 | Hodlewsky et al. | 198/851 |
| 4,597,492 | 7/1986 | Lachonius et al. | 198/852 |
| 4,645,070 | 2/1987 | Homeier | 198/852 |
| 4,893,709 | 1/1990 | Schroeder et al. | 198/852 |
| 4,961,492 | 10/1990 | Wiseman et al. | 198/841 |

FOREIGN PATENT DOCUMENTS

| | | | |
|---|---|---|---|
| 934690 | 10/1973 | Canada | 198/852 |
| 0066530 | 5/1982 | European Pat. Off. | B65G 17/08 |
| 3046568 | 7/1982 | Germany . | |
| 3235224 | 7/1987 | Germany . | |
| 767567 | 2/1957 | United Kingdom | 198/852 |

OTHER PUBLICATIONS

DYNA-VEYOR, Pamphlet, 3 pages, Apr. '75.

*Primary Examiner*—Joseph E. Valenza
*Attorney, Agent, or Firm*—Michael, Best & Friedrich

[57] ABSTRACT

A chain for use in an article carrying conveyor includes a plurality of interconnected molded plastic chain link assemblies each having a planar top plate. A plurality of upper and lower tabs formed along the lower portions of the chain link assemblies function to guide the chain relative to a pair of guide rails of the conveyor frame while permitting free removal of the chain link assemblies from the guide rails at selected areas along the length of the conveyor and also restraining the chain between the guide rails at other portions of the conveyor such as at curves or vertical bends.

6 Claims, 2 Drawing Sheets

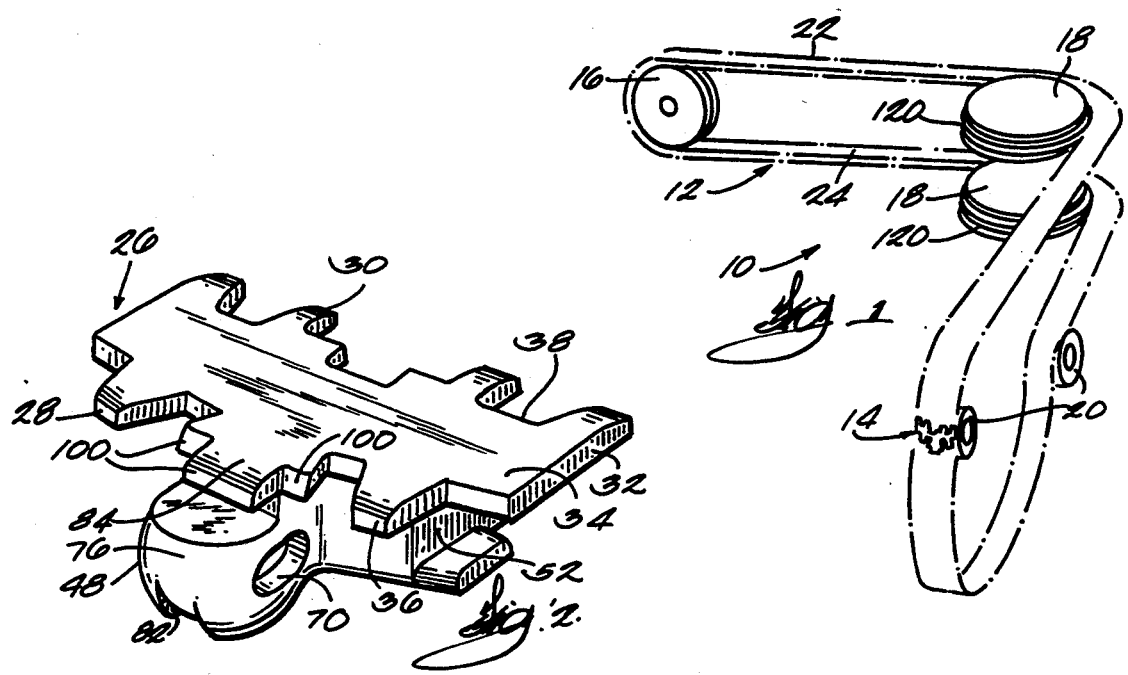
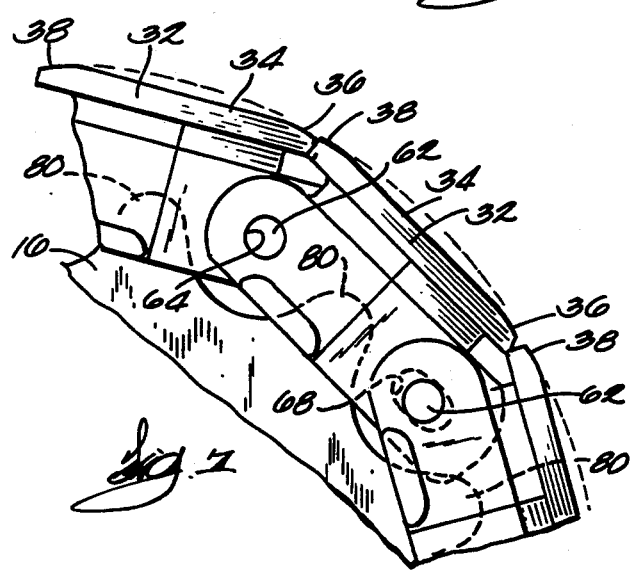
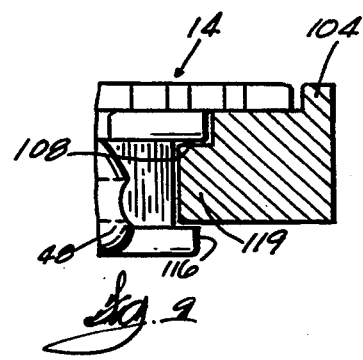
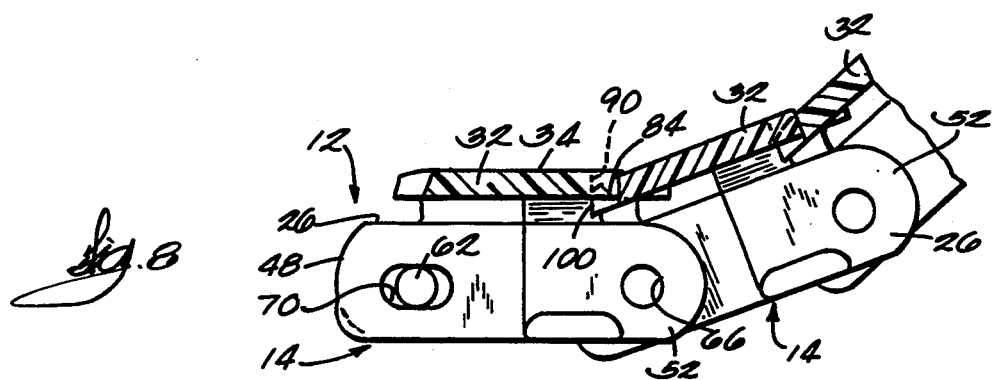

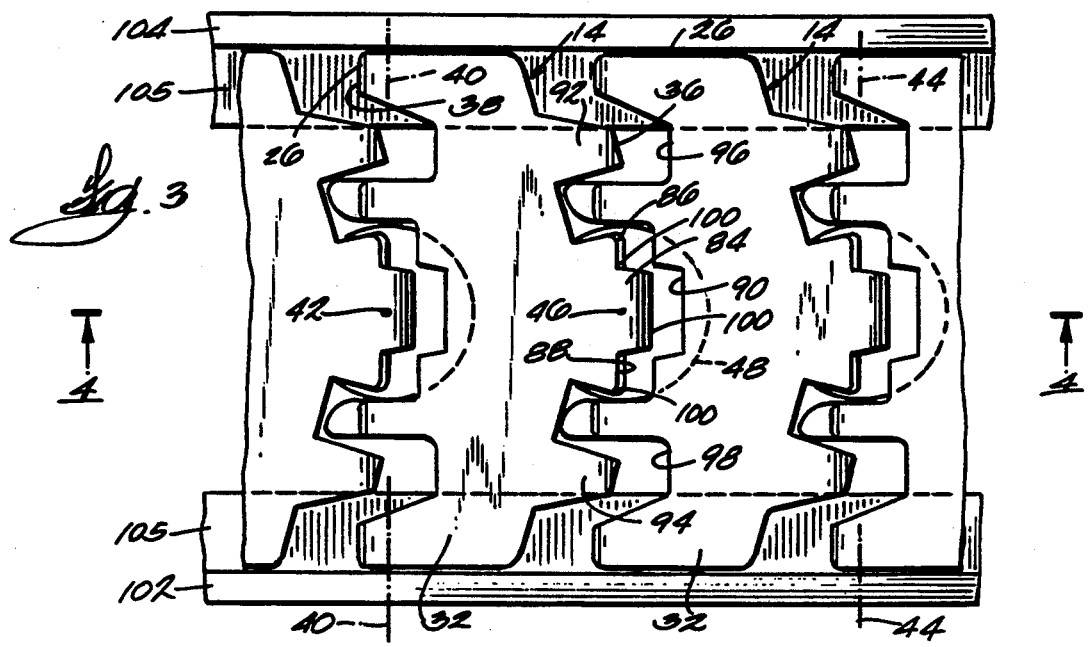

ARTICLE CARRYING CHAIN HAVING FREE TAB

This application is a continuation of application Ser. No. 234,322, filed Aug. 18, 1988, now abandoned.

FIELD OF THE INVENTION

This invention relates generally to chains, and, more particularly, to flat-top article carrying chains wherein the chain is made up of a plurality of molded plastic links.

BACKGROUND PRIOR ART

Flat-top article carrying chains formed of molded plastic links are known and are shown, for example, in U.S. Pat. Nos. 3,269,526, 3,768,631, 3,779,368, 3,804,232 and 4,436,200. Attention is also directed to German patent 32 35 224 C2 and to a catalog publication by Dyna-Veyor Inc. Cranford, N.J. dated April 1975 and also showing flat topped article carrying chains.

SUMMARY OF THE INVENTION

It is a general object of the present invention to provide a new and improved article carrying chain formed of molded plastic links.

It is also an object of the present invention to provide a new and improved article carrying chain wherein the chain is adapted to be supported on a pair of guide rails and wherein at selected locations along the length of the conveyor the individual chain links can be directly lifted from, or dropped directly onto, the guide rails whereas at other portions of the conveyor the chain links will be restrained against movement out of the guide rails.

It is another object of the invention to provide a chain link which can be directly lifted from, or directly dropped onto, the guide rails at selected areas or sections of the conveyor, and which is further adapted to be restrained against vertical movement with respect to the guide rails while rounding corners or at the areas of the conveyor where the guide rails curve upwardly or downwardly.

The invention provides a chain link adapted for use in an article carrying conveyor wherein a plurality of such chain links are supported between a pair of guide rails having upper surfaces and opposed edges separated by an open gap. The chain link includes a substantially planar top plate dimensioned to extend over the gap between the guide rails so as to be supported on the upper surfaces of the guide rails. A lower portion depends downwardly from the underside of the planar top plate and has a width less than that of the width of the gap between the guide rails such that there can be free sliding movement of the lower portion between the guide rails. A pair of upper tabs are formed adjacent the juncture of the lower portion with the underside of the top plate and are dimensioned to fit between the opposed edges of the guide rails so as to substantially oppose sideways movement of the top plate relative to the guide rails. A pair of lower tabs extend outwardly from the lower portion and are spaced below the upper tabs so as to define a groove along each side of the lower portion between the upper tabs and the lower tabs. The lower tabs function to restrain the chain links against upward movement out of the guide rails at those sections of the conveyor where the guide rails include portions extending into the spaces between the upper and lower tabs. The lower tabs have a width which is less than or equal to the width of the upper tabs to permit upward removal of the chain links at other sections of the conveyor.

BRIEF DESCRIPTION OF THE DRAWINGS

The features of the present invention which are believed to be novel are set forth with particularity in the appended claims. The invention, together with the further objects and advantages thereof, may best be understood by reference to the following description, taken in conjunction with the accompanying drawings, in the several figures of which like reference numerals identify like elements, and in which:

FIG. 1 is a simplified diagrammatic view of a conveyor system incorporating an article carrying chain embodying various features of the invention.

FIG. 2 is a perspective view of a unitary chain link member embodying various features of the invention.

FIG. 3 is a top plan view of the article carrying chain incorporated in the conveyor illustrated in FIG. 1.

FIG. 4 is a cross-sectional view taken along line 4—4 in FIG. 3.

FIG. 5 is an end view of one link of the article carrying chain supported between a pair of guide rails.

FIG. 6 is a bottom plan view of the article carrying chain incorporated in the conveyor illustrated in FIG. 1.

FIG. 7 is a fragmentary side elevational view of the article carrying chain showing the chain passing over a driven sprocket.

FIG. 8 is a side elevational view of the article carrying chain shown in a maximum back-flex position.

FIG. 9 is a partial view similar to FIG. 5 and illustrating a chain link housed between guides members which prevent upward movement of the chain with respect to the guide members.

DESCRIPTION OF THE PREFERRED EMBODIMENT

Referring to the drawings, a conveyor 10 including an article carrying chain 12 embodying various features of the invention, is illustrated in FIG. 1. The chain 12 comprises a plurality of substantially identical chain link assemblies 14 joined to one another in end-to-end relationship so as to form a closed loop. The closed loop is reeved over a powered drive wheel or sprocket 16 and over a plurality of corner disks 18 and idlers 20 so as to form an upper run 22, on which articles can be carried, and a lower return run 24. It will be appreciated that, in order to increase flexibility in the configuration of the conveyor 10, it is desirable that the capability for limited pivotal movement, in both the horizontal and vertical planes, be provided between adjacent chain link assemblies 14 within the chain 12.

The construction of the chain link assemblies 14 can best be understood by reference to FIGS. 2 through 6. As shown, each chain link assembly 14 includes a unitary chain link member 26 formed of a molded thermoplastic material such as, for example, "Delrin," and includes a leading end 28 and a trailing end 3C. Each of the unitary chain link members 26 includes a top plate 32 having a generally planar upper surface 34 and forward and rearward edges 36 and 38.

In order to provide the desired capability for chain articulation in both the horizontal and vertical planes, means are provided in each chain link assembly 14 for facilitating connection of each chain link member 26 to a trailing or following chain link member 26 so as to permit limited pivoting movement between the chain link member 26 and the following chain link member around a first horizontal axis 40 oriented substantially parallel to the top plate 32, and around a first vertical axis 42 oriented substantially perpendicularly to the top plate 32. Additional means are formed adjacent the underside of the top plate 32 for facilitating connection of a particular chain link member 26 to a leading or preceding chain link member 26 so as to permit limited pivoting movement between the chain link member and the preceding chain link member around a second horizontal axis 44 oriented parallel to the top plate, and around a second vertical axis 46 oriented perpendicularly to the top plate 32. In the illustrated embodiment, such means include a forward head or knuckle portion 48 formed along the underside of the top plate 32 adjacent the forward end of the chain link member 26 and further include a lower portion comprising a pair of spaced side bar portions 50, 52 extending rearwardly from the knuckle portion 48 below the top plate 32. The side bars 50, 52 are spaced from each other to form a socket 54 along the trailing end of the chain link member 26 into which the knuckle portion 48 of the following chain link member 26 can be received.

The knuckle portion 48 of each chain link member 26 is generally cylindrical in form and includes a generally cylindrical hollow interior 56 having a closed forward end 58 and an open rear end 60. Thus, when the knuckle portion 48 of one chain link member 26 is positioned between the side bars 50, 52 of a preceding chain link, limited pivoting movement between the chain links around the axes 42, 46 oriented substantially perpendicularly relative to the top plates 32 of the chain links 26 is possible. In addition, the upper surface of the knuckle portion 48 is flattened so that limited pivoting movement of the chain links, around the axes 40, 44 extending generally across the width of the chain 12, is possible.

The interlocking chain link members 26 are joined to one another by means of a connecting pin 62 extending through aligned apertures 64, 66 formed in the rearward portions of the side bars 50, 52, and through additional apertures 68, 70 formed in the knuckle portion 48 positioned therebetween. Preferably, the apertures 68, 70 formed in the knuckle portion 48 of each chain link member 26 are elongated so that the chain link member 26 can pivot in a horizontal plane around the connecting pin 62.

Each chain link assembly 14 further includes a molded plastic insert 72 which is dimensioned to fit closely within the hollow interior 56 of the knuckle portion 48 around the connecting pin 62. Each insert 72 also includes a transverse bore 74 of elongated cross section dimensioned as to permit limited pivoting movement of the chain link members 26 in a horizontal plane relative to one another.

As best seen in FIGS. 2 and 4, the forwardmost end 76 of each knuckle portion 48, and the rearwardmost surface 78 of each insert 72, are shaped so as to conform to the shape defined between adjacent teeth 80 of the drive sprocket 16. To this end, a notch or groove 82 is formed in the lower forward end 76 of the knuckle portion 48, and the rearward surface 78 of the insert 72, exposed between the forwardmost ends of the side bars 50, 52 at their juncture with the knuckle portion 48, is curved to the shape of the sprocket teeth 80. When so shaped, each chain link assembly 14 is capable of being driven in either direction by the drive sprocket 16. Thus, the chain 12, and therefore the conveyor 10, are capable of bi-directional operation.

Referring to FIG. 3, the top plate 32 of each chain link assembly 14 is substantially symmetrical about the center line of the chain 12, and the forward and rearward edges 36, 38 of the top plate 32 are provided with generally complementary projections and notches. In particular, the forward edge 36 of each top plate 32 includes a central projection 84 having a pair of side notches 86, 88 while the trailing edge 38 includes a central notch 90 corresponding generally to the shape of the central projection 84. The forward edge 36 of each top plate 32 further includes a pair of forwardly projecting, trapezoidally-shaped, spaced side projections 92, 94 on either side of the central projection 84, while the rearward edge 38 of each top plate 32 includes a pair of complementary notches 96, 98. The spacing between the top plates 32 of adjacent ones of the chain link members 26 when the links are interconnected by the connecting pins 62 is such that a definite clearance is maintained between adjacent top plates 32 when the chain 12 is substantially unflexed. When the chain 12 is flexed either right or left in the horizontal plane, clearance is maintained between the top plates 32 while the interfitting side projections 92, 94 and notches 96, 98 move closer to each other along the inside of the turn and away from each other along the outside of the turn.

In the illustrated embodiment, a bevel 100 is provided on the forwardmost edges of the central top plate projection 84 and the two side notches 86, 88 such that, when the chain 12 is flexed to the maximum position shown in FIG. 8, the bevelled face 100 of the central projection 84 of a trailing link engages the rear face of central notch 90 of a preceding link in face to face relation. In a preferred form of the invention the bevelled face defines an angle of 10° with respect to the vertical. Although the bevel 100 is shown as being on the central projection, it will be appreciated that the bevel could, alternatively, be formed in the central notch 90. As best seen in FIG. 8, if the chain, when the chain is "back-flexed" (i.e. curved around a center of curvature located above the carrying surface of the chain 12), the central projections 84 of the chain links are driven into contact with the central notches 90 of the preceding chain links. Because of the bevel 100, such contact is face to face and line contact between adjacent links is avoided. This helps reduce wear and avoids damage to or breakage of the adjacent chain link members 26 resulting from such line contact.

In order to prevent undesired product kick-up as the chain 12 proceeds to pass over the sprocket 16 as illustrated in FIG. 7, the upper surface 34 of the top plate 32 of each chain link member 26 is downwardly curved along both the forward and rearward edges 36, 38 of the top plate 32. As illustrated, the upper surface 34 of the top plate 32 along the rearward edge 38 is curved to a radius centered on the axis defined between the apertures 64, 66 formed in the side bars 50, 52 while the upper surface 34 of the top plate 32 along the forward edge 36 is curved to a radius centered on the axis through the apertures 68, 70 formed through the knuckle portion 48 of the chain link member 26. When so shaped, the forward and rearward edges 36, 38 of each chain link member 26 do not project above the conveying surface of the chain 12 as the chain 12 passes over a sprocket 16 as illustrated in FIG. 7. Undesired product kick-up is thus avoided.

Referring to FIG. 5, the article conveying chain 12 is adapted to be supported between a pair of opposed, spaced guide rails 102, 104 each including an inner ledge 105. The top plate 32 is dimensioned to rest on the ledges 105 between the opposed guide rails 102, 104, and a pair of upper tabs 106, 108 integrally formed on the outer sides of each of the side bars 50, 52 fit between the inner opposed edges 110, 112 of the guide rail ledges 105. The upper tabs 106, 108 function to limit sideways movement of the chain 12 by riding along the inner opposed edges 110, 112 of the guide rail ledges 105.

Each chain link member 26 further includes a pair of lower tabs 114, 116 formed on the side bars 50, 52 and spaced below the upper tabs 106, 108 so that a generally rectangularly sectioned groove 118 is formed along each side of the chain link member 26 in the outer side faces of the lower portion. The lower tabs 114 and 116 are provided to function as a means for maintaining the chain link in place with respect to the guide rails at selected locations along the guide rails. For example, the groove 118 is dimensioned and positioned so as to receive an outwardly projecting, circumferentially extending, retaining ridge 120 (FIG. 1) formed on the outer periphery of each of the corner disks 18. Thus, when a chain link assembly 14 passes around the corner disk 18, the circumferential ridge 120 extends into the groove 118 formed between the upper and lower tabs of the chain link member 26, and the lower tabs 114 and 116 lock the chain link assemblies 14 against vertical movement relative to the corner disk 18. This helps prevent the chain 12 from rising as it travels around the corner disk 18. Additionally, in other areas of the conveyor, for example where the conveyor may curve upwardly, as shown in FIG. 9, the conveyor rails 102 and 104 can be provided with retaining projections 119 extending inwardly from the rails and housed in the grooves 118 and such that engagement of the lower tabs 114 and 116 with the retaining projections 119 will prevent upward movement out of the chain links out of the conveyor.

As best seen in FIG. 5, the distance across the lower tabs 114, 116 of each chain link member 26 is less than or equal to the distance across upper tabs 106 and 108, and in those sections of the conveyor or where the conveyor rails have a configuration as in FIG. 5, each chain link member 26 can be lifted upwardly from the guide rails 102, 104 without interference. This avoids the need to thread the chain links over the ends of the guide rails during installation or removal of the chain.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A chain link comprising:
   a top plate having an upper article carrying surface and the top plate having an underside;
   a lower portion depending downwardly from the underside of the top plate the lower portion including a forward portion defining a first opening adapted to house a first chain pin and a rearward portion defining a second opening adapted to house a second chain pin;
   a pair of upper tabs extending outwardly from the lower portion adjacent the top plate and having a width transverse to the direction of travel of the chain link, each of said upper tabs including an outwardly facing rail engaging surface generally transverse to said top plate, each of said rail engaging surfaces being contiguous with the underside of said top plate, said rail engaging surfaces being adapted to restrict lateral movement of the top plate; and
   a pair of lower tabs projecting from the lower portion, the lower tabs being spaced below the upper tabs so as to define a groove therebetween, the lower tabs having a width no greater than the width of the upper tabs.

2. A chain link in accordance with claim 1 wherein said top plate, said lower portion, said upper tabs and said lower tabs are integrally formed of molded plastic.

3. A chain link in accordance with claim 1 wherein each of said grooves is of substantially rectangular cross-section.

4. A conveyor chain comprised of a plurality of chain links joined together by chain pins, each of the chain links comprising:
   a top plate having an upper article carrying surface and the top plate having an underside;
   a lower portion depending downwardly from the underside of the top plate the lower portion including a forward portion defining a first opening adapted to house a first chain pin and a rearward portion defining a second opening adapted to house a second chain pin;
   a pair of upper tabs extending outwardly from the lower portion adjacent the top plate and having a width transverse to the direction of travel of the chain link, each of said upper tabs including an outwardly facing rail engaging surface generally transverse to said top plate, each of said rail engaging surfaces being contiguous with the underside of said top plate, said rail engaging surfaces being adapted to restrict lateral movement of the top plate; and
   a pair of lower tabs projecting from the lower portion, the lower tabs being spaced below the upper tabs so as to define a groove therebetween, the lower tabs having a width no greater than the width of the upper tabs.

5. A conveyor chain in accordance with claim 4 wherein said top plate, said lower portion, said upper tabs and said lower tabs are integrally formed of molded plastic.

6. A conveyor chain in accordance with claim 4 wherein each of said grooves is of substantially rectangular cross-section.

* * * * *